Nov. 5, 1929.                C. S. COLEMAN                1,734,612
                               FISHHOOK
                          Filed July 31, 1928
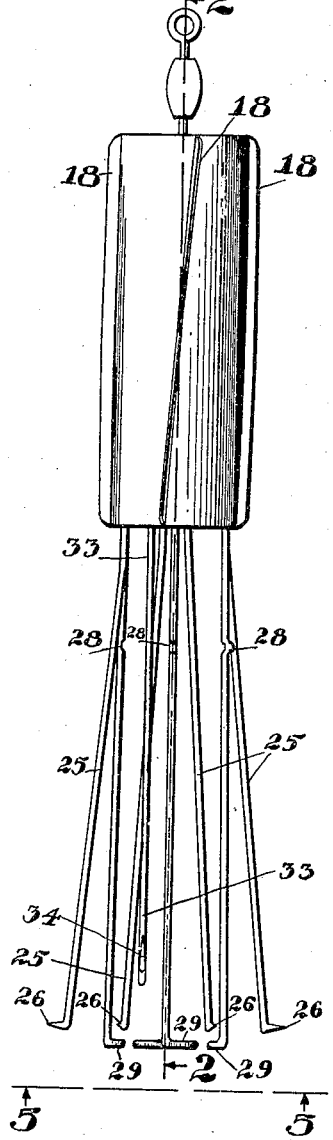
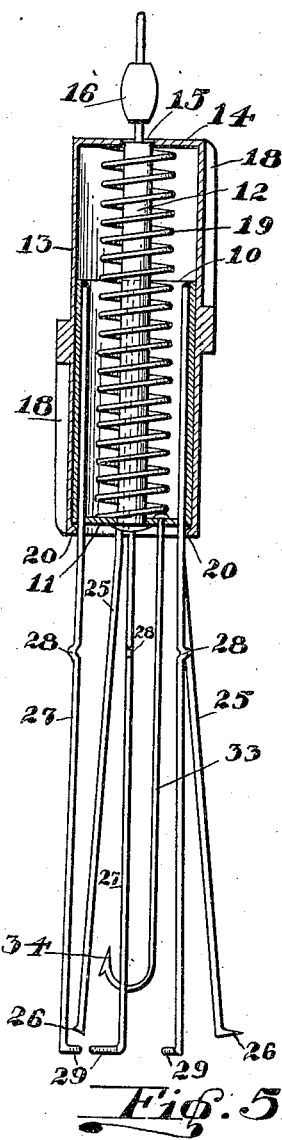
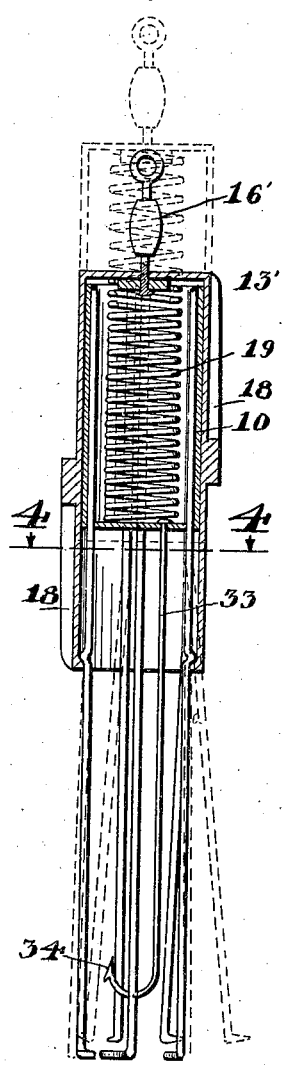
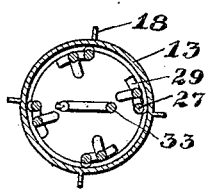
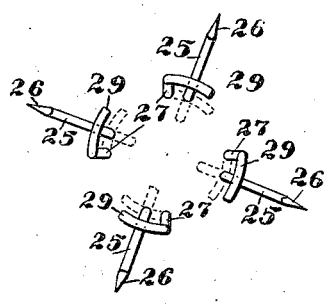
Inventor:
Charles S. Coleman.
By R. S. Berry
Attorney Patented Nov. 5, 1929

1,734,612

UNITED STATES PATENT OFFICE

CHARLES S. COLEMAN, OF LOS ANGELES, CALIFORNIA

FISHHOOK

Application filed July 31, 1928. Serial No. 296,494.

This invention relates to fish hooks and deals with a fish hook of the type wherein the fish operates a tripping mechanism that causes the hook to become highly effective.

An object of this invention is to provide a fish hook that upon being taken by a fish will expand in his mouth and become firmly fixed therein.

Another object is to provide a fish hook with a plurality of hooking points so placed that two or more points will always find lodgement in the mouth of a fish.

Another object is to provide a fish hook wherein the hooking points have no barbs. This makes for ease of extraction, and does not tear the mouth of the fish upon removing the hooks.

Another object is to provide a fish hook that once within the mouth of a fish can be pulled from any angle without danger of dislodgment.

Another object is to provide a fish hook that will rotate to draw the attention of the fish.

Another object is to provide a rotating fish hook having bait carrying means.

A further object is to provide a fish hook that will operate to hold open the mouth of a fish. This is particularly advantageous in trying for game fish which require some time to land and by holding the mouth open, they will eventually drown.

Briefly described, my invention may be said to reside in a plurality of circumferentially spaced hooking points formed on the ends of spring wire, together with means for retaining, under tension, said hooking points within a prescribed circle and means actuated by the fish to release said hooking points to fly outwardly and find lodgment in the mouth of the fish.

The foregoing objects, together with any subsequent advantages that may be disclosed in the description or claims, constitute my invention, a preferred form and a modification of which are shown in the accompanying drawings, in which:

Fig. 1 is an elevation of the preferred form of the hook as it appears when released;

Fig. 2 is a vertical section on line 2—2 of Fig. 1;

Fig. 3 is a vertical section of a modified form;

Fig. 4 is a section on line 4—4 of Fig. 3;

Fig. 5 is a bottom view on line 5—5 of Fig. 1.

Recourse is now had to the drawings for a more detailed description. In Fig. 2, the device is shown as consisting of an inner hollow cylinder 10 closed at the lower end by a cross member 11 and having, extending upwardly from said cross member 11, a stem 12. Slidably mounted upon the inner cylinder 10 is an outer shell 13 open at the lower end and closed at the upper end by a cross member 14, which member 14 is provided with an opening 15 adapted to pass the stem 12.

As a means of attaching a line to the device, a swivel 16 is fixed to the end of the stem 12 and allows the device to rotate as a unit in response to the effect of spiral fins 18 when the hooks pass through the water. Before slipping the outer shell 13 over the inner cylinder 10, a helically wound spring 19 is placed around the stem 12. After the outer shell 13 has been slipped over the inner cylinder 10, the lower edge is crimped as shown at 20. This crimping serves as a stop for the outer sleeve 13 as it travels over the inner cylinder 10 urged by the spring 19.

Suitably mounted within the inner hollow cylinder 10, is a plurality of spring wires 25 having hook points 26 at their outer extremities. Also similarly mounted within the hollow cylinder 10, is a second set of spring wires 27 having a small projection 28 struck therein and carrying at their lower ends, portions 29 of the wire bent at right angles to the shank of the wire which portions are then formed in an arc of a circle.

Fig. 3 shows a modification of the device, wherein all the elements are identical and function the same except the stem 12 is omitted and the swivel 16' is attached directly to the outer sleeve 13'.

For fishing, where bait may be needed, there is provided a wire 33 suitably attached to the inner cylinder 10 and formed with a bait holding hook 34 at the lower end thereof.

In operation, the hook is first set by sliding the sleeve 13 down until the crimp 20 at the lower end thereof engages the projection 28 on the wire 27. The wire 25 carrying hooks 26 which normally fly out and take the position shown in Figs. 1 and 2 and by the solid lines in Fig. 5, are thus compressed inwardly and take the position shown by the dotted lines in Fig. 5, or the solid lines in Fig. 3. The wires 27 are also put under a tension which slightly draws the arcs 29 into closer relation. By this arrangement, the points of the hooks 26 are withdrawn into the circle prescribed by the arcs 29.

When the fish strikes, he takes the arcs 29 in his mouth and bites them together, thus forcing the wires 27 closer together and thereby releasing the crimp 20 on the outer sleeve from the shoulder 28 on said wires and permitting the sleeve 13 to be snapped upward impelled by the spring 19. As the sleeve 13 snaps upward, the hooks 26 fly outward and embed themselves in the mouth of the fish in such a manner as to pry his mouth open and hold it open. The more he bites the further the hooks sink in, until in the case of a game fish putting up a long fight, he finally yields to the pressure of the hooks and holds his mouth open until he drowns.

The foregoing description deals with a preferred and a modified form of my invention and since there are many other modifications possible, I reserve the right to such alterations as come within the scope of the specification and the spirit of the appended claims.

I claim:

1. A fish hook comprising an inner cylinder, an outer sleeve slidably mounted upon said cylinder, a plurality of spring wires mounted in said inner cylinder, and having hooks formed at their outer ends which hooks are adapted to normally extend outward, a second set of spring wires mounted in said inner cylinder and having bent portions at their outer ends, means on the said second set of wires for lightly holding said outer sleeve upon being slid to an extended position relative to said inner cylinder, and means for yieldingly urging said outer sleeve to return to normal position.

2. A fish hook comprising an inner cylinder, an outer sleeve slidably mounted over said cylinder, a plurality of spring wires mounted in said inner cylinder, and having hooks formed at their outer ends adapted to normally extend beyond the periphery of said outer sleeve, a second set of spring wires mounted in said inner cylinder, and having bent portions at the outer ends beyond said hooks, means on said second set of spring wires for lightly holding said outer sleeve when slid to an extended position relative to said inner cylinder tension, means for urging said outer sleeve to return to normal position, and means for causing the whole to rotate upon being drawn through water.

In testimony whereof, I have affixed my signature.

CHARLES S. COLEMAN.